US011429241B2

(12) United States Patent
Hou et al.

(10) Patent No.: US 11,429,241 B2
(45) Date of Patent: Aug. 30, 2022

(54) TOUCH PANEL, ELECTRONIC DEVICE AND INFORMATION PROCESSING METHOD BASED ON HEXAGONAL ELECTRODES

(71) Applicant: Chipone Technology (Beijing) Co., Ltd., Beijing (CN)

(72) Inventors: Lijie Hou, Beijing (CN); Lida Zhang, Beijing (CN); Chenming Gao, Beijing (CN); Xin Wang, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/961,240

(22) PCT Filed: Apr. 2, 2019

(86) PCT No.: PCT/CN2019/081077
§ 371 (c)(1),
(2) Date: Jul. 9, 2020

(87) PCT Pub. No.: WO2020/001116
PCT Pub. Date: Jan. 2, 2020

(65) Prior Publication Data
US 2021/0165533 A1 Jun. 3, 2021

(30) Foreign Application Priority Data
Jun. 26, 2018 (CN) .......................... 201810671485.5

(51) Int. Cl.
*G06F 3/044* (2006.01)

(52) U.S. Cl.
CPC .......... *G06F 3/0448* (2019.05); *G06F 3/0443* (2019.05)

(58) Field of Classification Search
CPC ............................. G06F 3/0448; G06F 3/0443
See application file for complete search history.

(56) References Cited

U.S. PATENT DOCUMENTS

| 2009/0218651 | A1* | 9/2009 | Frolov ............ H01L 31/022466 257/459 |
| 2016/0098129 | A1* | 4/2016 | Sung .................... G06F 3/04164 345/174 |
| 2016/0291717 | A1* | 10/2016 | Fu ........................ G06F 3/04164 |
| 2017/0177139 | A1* | 6/2017 | Yang ...................... H01L 27/323 |
| 2017/0205932 | A1* | 7/2017 | Yang .................... G06F 3/04166 |
| 2018/0358413 | A1* | 12/2018 | Lee ....................... H01L 27/3276 |
| 2019/0056820 | A1* | 2/2019 | Hoch .................... G06F 3/0446 |

(Continued)

FOREIGN PATENT DOCUMENTS

| CN | 101393502 | 3/2009 |
| CN | 104142757 A | 8/2014 |

(Continued)

*Primary Examiner* — Chun-Nan Lin
(74) *Attorney, Agent, or Firm* — Treasure IP Group, LLC

(57) ABSTRACT

The present disclosure provides a touch panel, electronic device and information processing method, the touch panel comprising: a substrate, and an electrode layer formed in or on the substrate, wherein the electrode layer and the touch panel have corresponding shapes, and the electrode layer comprises a plurality of hexagonal electrodes which are connected to form the electrode layer. The embodiments of the present disclosure have a simple structure and a better adaptability.

7 Claims, 7 Drawing Sheets

(56) References Cited

U.S. PATENT DOCUMENTS

| | | | |
|---|---|---|---|
| 2019/0073057 A1* | 3/2019 | Ahn | G06F 3/03547 |
| 2020/0159353 A1* | 5/2020 | Xie | G06F 3/0448 |
| 2020/0233531 A1* | 7/2020 | Weinerth | G06F 3/041662 |

FOREIGN PATENT DOCUMENTS

| | | | |
|---|---|---|---|
| CN | 104049815 A | 9/2014 | |
| CN | 105045426 A | 8/2015 | |
| CN | 204631838 | 9/2015 | |
| CN | 108710453 A | 10/2018 | |
| CN | 208506728 U | 2/2019 | |

* cited by examiner

TOUCH PANEL, ELECTRONIC DEVICE AND INFORMATION PROCESSING METHOD BASED ON HEXAGONAL ELECTRODES

CROSS-REFERENCE TO RELATED APPLICATIONS

This Application is a Section 371 National Stage Application No. PCT/CN2019/081077, filed on Apr. 2, 2019, entitled "TOUCH PANEL, ELECTRONIC DEVICE AND INFORMATION PROCESSING METHOD", which published as WO 2020001116 A1, on Jan. 2, 2020, and claims priority to Chinese Patent Application No. 201810671485.5, filed on Jun. 26, 2018, the contents of which are incorporated herein by reference in their entireties.

FIELD OF TECHNOLOGY

The present disclosure relates to the field of touch devices, in particular to a touch panel, an electronic device and an information processing method.

BACKGROUND

With the constant development of the touch technology, the application of a touch device becomes more and more popular at present. Almost all of conventional touch panels are rectangular, and patterns of corresponding touch electrodes are also rectangular or square. With the emergence of the Internet of things and wearable devices, the application and demand of special-shaped screens are strong; therefore, the touch panels in various shapes, such as a circular or an elliptic touch panel, are gradually generated.

Furthermore, a square touch electrode is difficult to adapt to the circular or other-shaped touch panels; therefore, existing square touch electrodes cannot be applied to diversified touch panels.

SUMMARY OF THE INVENTION

In view of the existing status, the present disclosure provides a touch panel, an electronic device and an information processing method having a simple structure and a better adaptability.

According to a first aspect of the present disclosure, provided is a touch panel, comprising: a substrate, and an electrode layer formed in or on the substrate, wherein the electrode layer and the touch panel have corresponding shapes, and the electrode layer comprises a plurality of hexagonal electrodes which are connected to form the electrode layer.

In an embodiment of the present disclosure, the plurality of electrodes comprise a first electrode and second electrodes, the second electrodes are sequentially connected and arranged in extending directions by taking the first electrode as a center.

In an embodiment of the present disclosure, the touch panel further comprises: a detection module, connected to the plurality of electrodes of the electrode layer, and configured to detect capacitances formed by the electrodes; and a data processing module, configured to determine touch information of the touch panel on the basis of the capacitances which are formed by the electrodes and detected by the detection module.

In an embodiment of the present disclosure, the data processing module is further configured to determine that the touch panel is touched if a total capacitance variation of the electrodes exceeds a first threshold value or at least one of the plurality of electrodes has a capacitance variation larger than a second threshold value.

In an embodiment of the present disclosure, the data processing module is further configured to determine a touch selection area on the basis of one or more electrodes each having a capacitance variation larger than a second threshold among the plurality of electrodes, and determine a touch position on the basis of the capacitance variations and weights of the electrodes in the touch selection area.

In an embodiment of the present disclosure, the data processing module is further configured to determine an electrode, having a largest capacitance variation among the one or more electrodes each having the capacitance variation larger than the second threshold value, as a third electrode, and determine a preset range as the touch selection area, wherein the preset range extends outward by taking the third electrode as a center.

In an embodiment of the present disclosure, the data processing module is further configured to establish a three-axis coordinate system, and determine the weights of each electrode in the touch selection area respectively relating to three coordinate axes of the coordinate system, wherein each one of the weights of the corresponding electrode is determined on the basis of a projection distance from a central point of the corresponding electrode to a corresponding one of the coordinate axes; calculate, for each one of the coordinate axes, the products each obtained by multiplying the capacitance variation of a corresponding electrode by the weight of that corresponding electrode relating to the corresponding coordinate axes, and the ratio of a sum of the products corresponding to the electrodes to a sum of the capacitances formed by the electrodes in the touch selection area; and determine position coordinates of a touch point on the basis of the ratio corresponding to each coordinate axis.

In an embodiment of the present disclosure, the first electrode and the second electrodes each have a same shape which is regular hexagon.

In an embodiment of the present disclosure, the substrate is constructed in a circular shape or in an elliptic shape.

According to a second aspect of the present disclosure, further provided is an electronic device, comprising the touch panel as described in any one of the embodiments above.

According to a third aspect of the present disclosure, provided is an information processing method, wherein the method is used for determining touch information of a touch panel, and comprises: acquiring capacitances of a plurality of hexagonal electrodes connected to form an electrode layer of the touch panel, wherein the electrode layer and the touch panel have corresponding shapes; and determining touch information of the touch panel on the basis of the detected capacitances formed by the plurality of electrodes.

In an embodiment of the present disclosure, wherein step of determining touch information of the touch panel on the basis of the detected capacitances formed by the plurality of electrodes comprises: determining capacitance variations of the plurality of electrodes; and determining that the touch panel is touched if a total capacitance variation of the electrodes exceeds a first threshold value or at least one of the plurality of electrodes has a capacitance variation larger than a second threshold value.

In an embodiment of the present disclosure, wherein step of determining touch information of the touch panel on the basis of the detected capacitances formed by the plurality of electrodes comprises: determining the capacitance variations of the plurality of electrodes; and determining a touch selection area on the basis of one or more electrodes each having a capacitance variation larger than a second threshold among the plurality of electrodes, and determining a touch position on the basis of the capacitance variations and weights of the electrodes in the touch selection area.

In an embodiment of the present disclosure, wherein step of determining a touch selection area on the basis of one or more electrodes each having a capacitance variation larger than a second threshold among the plurality of electrodes comprises: determining an electrode, having a largest capacitance variation among the one or more electrodes each having the capacitance variation larger than the second threshold value, as a third electrode; and determining a preset range as the touch selection area, wherein the preset range extends outward by taking the third electrode as a center.

In an embodiment of the present disclosure, wherein step of determining a touch position on the basis of the capacitance variations and weights of the electrodes in the touch selection area comprises: establishing a three-axis coordinate system; determining the weights of each electrode in the touch selection area respectively relating to three coordinate axes of the coordinate system, wherein each one of the weights of the corresponding electrode is determined on the basis of a projection distance from a central point of the corresponding electrode to a corresponding one of the coordinate axes; calculating, for each one of the coordinate axes, the products each obtained by multiplying the capacitance variation of a corresponding electrode by the weight of that corresponding electrode relating to the corresponding coordinate axes, and the ratio of a sum of the products corresponding to the electrodes to a sum of the capacitances formed by the electrodes in the touch selection area; and determining position coordinates of a touch point on the basis of the ratio corresponding to each coordinate axis.

In the embodiments of the present disclosure, the electrode layer of the touch panel may be formed by hexagonal electrodes; compared to a square electrode, the hexagonal electrode is more suitable for circular or elliptic touch panels; furthermore, owing to diversified combinations of hexagonal structures, the electrode layer formed by the hexagonal electrodes thereby is also suitable for square or other-shaped touch panels, thus having a better adaptability; in addition, the number of the electrodes can be reduced by adopting hexagonal electrodes, such that the number of electrode processing circuits can be reduced, thus reducing cost, and corresponding circuit design and power consumption; in addition, the adoption of hexagonal electrodes can improve touch detection sensitivity.

The other features and aspects of the present disclosure will become apparent according to the following detailed description on exemplary embodiments with reference to the drawings.

BRIEF DESCRIPTION OF THE DRAWINGS

The drawings contained in the specification and forming a part of the specification, together with the specification, show the exemplary embodiments, features and aspects of the present disclosure, and are used to explain the principle of the present disclosure.

DESCRIPTION OF THE EMBODIMENTS

Figure 1:
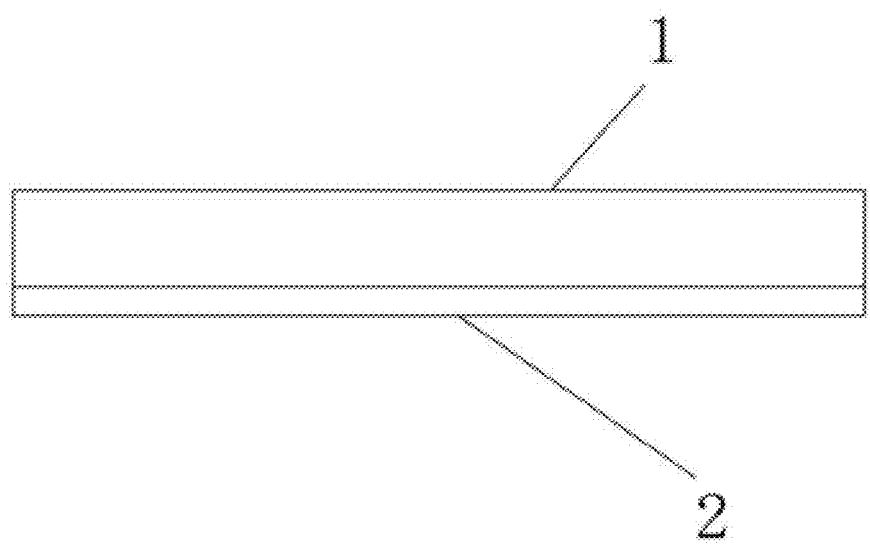
FIG. 1 shows a structural schematic view of the touch panel according to one embodiment of the present disclosure.

Various exemplary embodiments, features and aspects of the present disclosure will be described in detail hereafter with reference to the drawings. The same reference signs in the drawings denote elements having the same or similar functions. The drawings show various aspects of the embodiments. However, unless otherwise stated, the drawings are not necessarily drawn in proportion.

The term "exemplary" herein means "use as an example, an embodiment or an instance". Any embodiment described herein as an "exemplary" embodiment is not necessarily explained to be superior to or better than other embodiments.

In addition, in order to still better describe the present disclosure, numerous specific details are provided in the following descriptions of the specific embodiments. A person skilled in the art should understand that the present disclosure can still be implemented without certain specific details. In some embodiments, in order to highlight the subject matter of the present disclosure, the method, means, element and circuit well known to a person skilled in the art are not described in detail.

Figure 2:
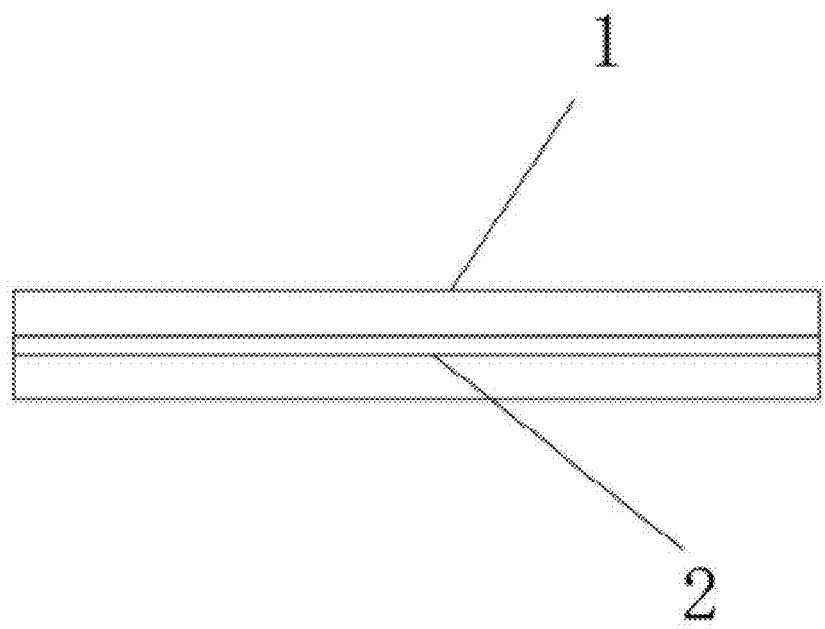
FIG. 2 shows a structural schematic view of the touch panel according to one embodiment of the present disclosure.
Figure 3:
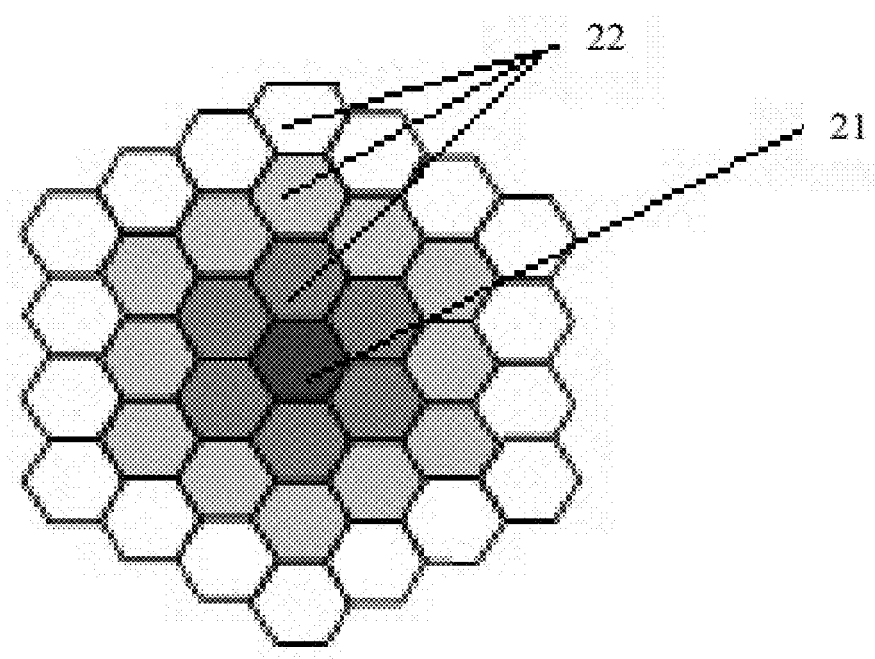
FIG. 3 shows a structural schematic view of the electrode layer according to one embodiment of the present disclosure.

FIG. 1 and FIG. 2 respectively show a structural schematic view of the touch panel according to one embodiment of the present disclosure; and FIG. 3 shows a structural schematic view of the electrode layer according to one embodiment of the present disclosure.

Wherein the touch panel in the embodiment of the present disclosure may comprise a substrate 1, and an electrode layer 2 formed in the substrate 1 (as shown in FIG. 2) or on the substrate 1 (as shown in FIG. 1). The substrate 1 may be treated as a panel for executing a touch operation; if the touch panel is a touch screen of an electronic device capable of performing display and touch, such as a mobile phone and the like, the substrate 1 may be a transparent glass substrate; and if the touch panel is a touch pad of a notebook computer, the substrate 1 may be a non-transparent operating substrate, alternatively, the substrate 1 can also be coated with a light shielding material so as to have an opaque state, which is not limited by the embodiment of the present disclosure.

In addition, the shape of the electrode layer 2 in the embodiment of the present disclosure may correspond to the shape of the touch panel; and the shape of the electrode layer 2 may also correspond to the shape of the substrate 1. For example, if the touch panel or the substrate 1 is in a circular shape or an elliptic shape, the electrode layer 2 can be constructed in a circular shape or an elliptic shape corresponding to the shape of the touch panel or the substrate 1; if the touch panel or the substrate 1 is in a square shape, the electrode layer 2 can also be constructed in a square shape corresponding to the shape of the touch panel or the substrate 1; alternatively, if the touch panel or the substrate 1 is in other shapes, the electrode layer 2 can also be constructed in a shape corresponding to the shape of the touch panel or the substrate 1, thus realizing the touch function of the touch panel in a corresponding area.

It should be noted that the touch panel in the embodiment of the present disclosure, other than the substrate 1 and the electrode layer 2, may further comprise a detection module 3 connected to the electrode layer 2, and a data processing module 4; if the touch panel is constructed as a touch panel of a touch screen, the touch panel may further comprise a polarizing plate, a liquid crystal layer, a thin film transistor (TFT) substrate and other components, so as to realize the functions of the touch panel such as display, touch and the like, which will not be described in detail here. A person skilled in the art can execute corresponding configurations according to different requirements.

In an embodiment of the present disclosure, a conductive film can be coated on one surface of or inside the substrate 1; and an electrode pattern of the electrode layer 2 can be formed on the conductive film. The electrode layer 2 in the embodiment of the present disclosure may comprise a plurality of hexagonal electrodes, wherein the plurality of electrodes are connected to form the electrode layer 2. In other words, the electrode layer 2 in the embodiment of the present disclosure can be formed by a plurality of mutually connected hexagonal electrodes, as shown in FIG. 3, the plurality of electrodes can be regular hexagons having the same side length. Wherein the electrode layer 2 may comprise a first electrode 21, and a plurality of second electrodes 22 sequentially connected and arranged in extending directions by taking the first electrode 21 as a center. That is, every two adjacent electrodes have a common side.

In an embodiment of the present disclosure, the electrode located in the center of the electrode layer 2 is considered to be the first electrode 21; multiple rings of electrodes extending outward by taking the first electrode 21 as a center are considered to be second electrodes 22; and each ring of second electrode 22 is connected to an electrode of its adjacent ring, wherein the ring adjacent to the first electrode 21 is a first ring; six second electrodes 22 can be disposed on the first ring; each second electrode 22 arranged on the first ring has a common side with the hexagon forming the first electrode 21; by analogy, twelve hexagons can be disposed on a second ring; by the same token, each second electrode 22 on the second ring can be respectively connected to the adjacent second electrode 21 on the first ring. In an embodiment of the present disclosure, if the ring number of the second electrode 22 is r, and the number of regular hexagon electrodes of the electrode layer 2 is h, then the relationship between r and h is: $h=3r^2+3^r+1$.

Alternatively, in other embodiments of the present disclosure, the side lengths of the hexagons forming the plurality of electrodes which are connected to form the electrode layer can be different, wherein the side length of the hexagon corresponding to a first electrode is n times that of the hexagons corresponding to second electrodes, n is an integer greater than 1. For example, if the side length of the first electrode is 2r, then the side length of the second electrodes sequentially connected and arranged in extending directions by taking the first electrode as a center will be r; one side of each first electrode is connected to two second electrodes respectively; by analogy, multiple rings of second electrodes 22 are respectively formed. In other words, in the embodiment of the present disclosure, the side lengths of the plurality of electrodes in the embodiment of the present disclosure can be different, if the plurality of hexagonal electrodes can be mutually connected to form the electrode layer 2 corresponding to the touch panel.

The electrode layer formed by hexagonal electrodes in the embodiment of the present disclosure can form a shape closer to a circle, thus is more suitable, compared to a square electrode, for existing special-shaped touch panels such as a circular or an elliptic touch panel; furthermore, hexagonal electrodes can also be combined to form a square shape, therefore, the electrode layer provided by the present disclosure is also suitable for a square touch panel, having a better adaptability. In addition, regardless of the shape of the touch panel, an effective touch area is almost circular; the electrode layer formed by hexagonal electrodes is closer to a circle, such that the effective touch area can be fit perfectly; in addition, for the touch panels in the same size, if square and hexagonal electrodes having the same area are utilized, the number of the required square electrodes is much greater than the number of the required hexagonal electrodes. The design of the hexagonal electrode can save the number of electrodes, and can reduce the areas of sampling circuit, transformation circuit, storage circuit and other related circuits of the touch chip.

In addition, after the electrode layer 2 is electrified, the same charges will be "non-uniformly" distributed on a boundary limited tablet capacitor, which can be specifically solved with a conformal transformation method; to simply summarize, the charge quantity at edges or sharp corners is greater than that in the center, and the charge quantity at the sharp corners is greater than that at the edges, which complies with the tip discharge principle. Such an edge field effect should be avoided in practical use. For a regular hexagon and a square having the same area, the regular hexagon is closer to a circle than the square, and points on the regular hexagon approximate to the center of the circle are more "uniformly" than that on the square and avoid forming the sharp corners. Furthermore, if a touch operation is executed, a touch area corresponding to the touch operation has a more uniform influence on the capacitances of the hexagon electrodes along a passing path during moving, thus having a higher position calculation accuracy. In addition, in an embodiment of the present disclosure, the influence of the touch operation on the capacitance variation of the hexagon electrode is proportional to the projection area of a contact area in the electrode pattern. The projections on square electrodes and regular hexagon electrodes have several possibilities as follows. If a touch point is at an intersection point of the vertexes of four adjacent square electrodes, the touch operation simultaneously acts on the four square electrodes, in which case the influence on a single square electrode is weakest, and the effective signal is easiest to be interfered by noises. For regular hexagon electrodes, the situation that the influence on the electrodes is weakest occurs if the touch point is at an intersection point of the vertexes of three adjacent regular hexagon electrodes, in which case the influence on a single regular hexagon electrode is better than that in the square situation; in the two situations, the ratio of touch signal magnitude of corresponding regular hexagon electrode to corresponding square electrode is about 6.51:4.91; that is, the regular hexagon electrodes are less influenced by the touch operation, and can more sensitively reflect the touch operation.

Figure 4:
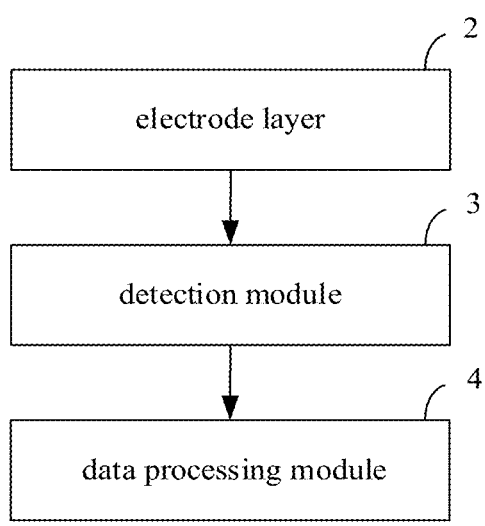
FIG. 4 shows an illustrative structural schematic view of the touch panel according to one embodiment of the present disclosure.

In addition, FIG. 4 shows an illustrative structural schematic view of the touch panel according to one embodiment of the present disclosure. As shown in the figure, the touch panel in the embodiment of the present disclosure may further comprise a detection module 3 and a data processing module 4.

Wherein the detection module 3 can be connected to the plurality of electrodes of the electrode layer 2, and is configured to detect the capacitances formed by the electrodes. The data processing module 4 can be connected to the detection module 3, and can be configured to determine the touch information of the touch panel on the basis of the capacitances formed by the electrodes detected by the detection module 3. Namely, the detection module 3 can be used to detect the capacitance formed by the electrodes of the electrode layer 2; if a touch operation occurs, the touch operation would cause capacitance variations to the electrodes; the detection module 3 detects in real time the capacitances formed by the electrodes, and determines the capacitance variation of each electrode, and transmits the capacitance variation to the data processing module 4, such that the data processing module 4 can further determine whether the touch operation occurs, and determine the information such as the position of the touch operation and the like. For example, the detection module 3 in the embodiment of the present disclosure may comprise one or more capacitive sensors; the plurality of electrodes can be respectively connected to the same capacitive sensor; alternatively, each electrode can be respectively connected to one capacitive sensor. The data processing module 4 can be connected to the one or more capacitive sensors to receive corresponding capacitance.

Firstly, the data processing module 4 can determine whether a touch operation occurs on the basis of the capacitance variation, for example, the data processing module 4 can determine whether a touch operation occurs on the basis of the capacitance variations of all the electrodes of the electrode layer 2, or can determine whether a touch operation occurs on the basis of the capacitance variation of the capacitance-changed electrode of the electrode layer 2. The data processing module 4 can acquire the capacitances and the capacitance variations of all the electrodes of the electrode layer 2 by the detection module 3, and can determine a touch operation is executed on the touch panel if a total capacitance variation of the capacitance-changed electrodes exceeds a first threshold value. Alternatively, the data processing module 4 can also determine that the touch panel is touched if at least one of the plurality of electrodes has a capacitance variation larger than a second threshold value. If the data processing module 4 determines that the total capacitance variation of the capacitance-changed electrodes does not exceed the first threshold value, and none of the capacitance variation of the plurality of electrodes exceeds the second threshold value, it can be determined that no touch operation is executed on the touch panel, and no response will be made. Wherein the first threshold value and the second threshold value can be the same, and can also be different, which can be set by a person skilled in the art according to different requirements.

If the touch panel is determined to be touched, the data processing module 4 can further determine a touch position of the touch operation. In an embodiment of the present disclosure, the data processing module 4 can determine a touch selection area on the basis of one or more electrodes each having a capacitance variation larger than the second threshold among the plurality of electrodes, and determine a touch position on the basis of the capacitance variations and weights of the electrodes in the touch selection area.

As described above, in an embodiment of the present disclosure, the data processing module 4 can first determine a touch selection area according to the electrodes of which the capacitance variations exceed the second threshold value, the touch selection area is an approximate position area of the touch operation. In an embodiment of the present disclosure, the data processing module 4 can acquire identification information and corresponding position information of the plurality of electrodes of the electrode layer 2. For example, the data processing module 4 can store the identification information and the position information, or can acquire the identification information and the position information from a memory. If the detection module 3 transmits the capacitances or the capacitance variations of the electrodes to the data processing module 4, the detection module 3 can transmit the identification information of the electrodes, such that the data processing module 4 can easily determine the positions of the capacitance-changed electrodes. Wherein the identification information is unique information for determining the electrode, and can be a unique code or an icon, which will not be defined herein.

The data processing module 4 can determine the touch selection area on the basis of the positions of all the electrodes of which the capacitance variations exceed the second threshold value, that is, the touch selection area is formed by all of the electrodes of which the capacitance variations exceed the second threshold value. Alternatively, in another embodiment of the present disclosure, the data processing module 4 can also determine the touch selection area according to a preset rule on the basis of the position of the electrode with the greatest capacitance variation. The data processing module 4 can determine an electrode, having a largest capacitance variation among the one or more electrodes each having the capacitance variation larger than the second threshold value, as a third electrode, and determine a preset range as the touch selection area, wherein the preset range extends outward by taking the third electrode as a center. For example, the data processing module 4 can take the third electrode as a center and arrange the plurality of electrodes in extending directions by a preset number of rings, and determine the area formed by the electrodes in the rings as the touch selection area. That is, if a touch operation is executed, the position of the electrode with the greatest capacitance can be basically determined as a position in proximity to a touch center; the data processing module 4 extends outward by the preset number of rings by taking the electrode with the greatest capacitance corresponding to the position as a center; and the electrodes in the rings form the touch selection area.

The embodiment of the present disclosure can determine the preset range in multiple ways. For example, the information pertaining to the preset number of rings can be determined according to a preset parameter; that is, the ring number information can be preset by a user, and can also be pre-stored in the data processing module 4; if a touch selection area is determined, the preset information can be directly used by the data processing module 4 to execute the operation.

In other embodiments of the present disclosure, the data processing module 4 can also determine the above-described preset number of rings according to a touch range in which the user executes touch operations in a preset time; that is, the data processing module 4 can record a range of touch areas in which the user executes touch operations in a preset time, and determine the above-described preset number of rings on the basis of the size of the preset range and the size of the electrodes. For example, the range of the touch area can be embodied in an area manner; first an average range of touch operations is determined via an average area of touch ranges in which the touch operations are performed in a preset time, and the information pertaining to the number of rings can be determined on the basis of the average range and the size of the electrodes. The touch operations in the embodiment of the present disclosure can be a single point touch operation, and can also be a continuous touch operation, wherein the continuous touch operation can be considered to be multiple single point touch operations.

After the preset number of rings is determined, the data processing module 4 can extend outward by the preset range corresponding to the preset number of rings by taking the third electrode as a center, so as to determine the touch selection area. After the touch selection area is determined, the data processing module 4 can further determine a position of the touch point; for example, the position of the touch point can be determined on the basis of the capacitance variations and weights of the electrodes in the touch selection area.

As described above, the data processing module 4 in the embodiment of the present disclosure can acquire the position information of the plurality of electrodes; and the position information can be denoted in a coordinate manner. In an embodiment of the present disclosure, a three-axis coordinate system can be established to denote the position information of the electrodes.

Figure 5:
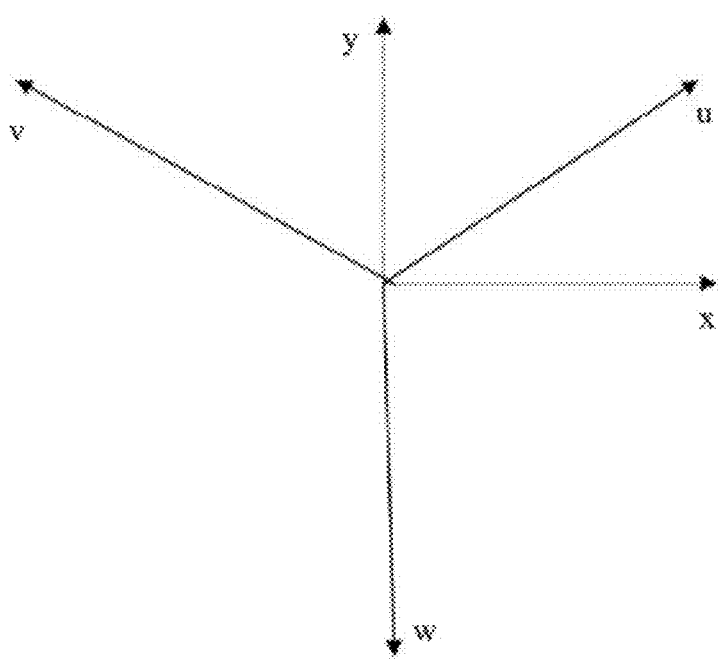
FIG. 5 shows a structural schematic view of the three-axis coordinate system of the touch panel according to one embodiment of the present disclosure.

FIG. 5 shows a structural schematic view of the three-axis coordinate system of the touch panel according to one embodiment of the present disclosure, wherein u-axis, v-axis and w-axis of the three-axis coordinate system are arranged in the same plane; the angle between every two axes is 120 degrees; and the center of the first electrode can be the origin point of the three-axis coordinate system. To facilitate expression, square orthogonal coordinate axes can be respectively defined as x-axis and y-axis; correspondingly, regular hexagon orthogonal coordinate axes can also be x-axis and y-axis, and u-axis, v-axis and w-axis are distributed every $2\pi/3$ angle, wherein the w-axis and the y-axis are opposite in direction. The coordinates on the x-axis and the y-axis of the rectangular coordinate system and the coordinates on the u-axis, the v-axis and the w-axis of the three-axis coordinate system can be mutually transformed; furthermore, the u-axis, the v-axis and the w-axis of the three-axis coordinate system are averagely distributed in a two-dimensional plane, therefore, an effective coordinate value of a regular hexagon satisfies $u+v+w=0$, that is, the sum of the coordinate values on the three coordinate axes is zero.

In addition, in an embodiment of the present disclosure, the coordinate values u, v and w in the three-axis coordinate system can be transformed into x and y in the rectangular coordinate system. U/V/W coordinates (u, v, w) can be transformed into X/Y coordinates (x, y) by the following formula:

$$x = \left[\frac{u-w}{|u-w|+eps}\right]\sqrt{|[(u-w/\cos(2\pi/3))/\tan(\pi/3)]^2 + u^2 - v^2 + eps|},$$

$$p = u-w, q = \left[\frac{u - \frac{w}{\cos(2\pi/3)}}{\tan(\pi/3)}\right]^2 + u^2 - v^2, x = \text{sign}(p)\cdot\sqrt{q}, y = -v$$

Wherein sign(p) is the polarity of p, and the value of sign(p) is +1 or 1; if p is 0, the value of sign(p) is +1; and the value of q is a non-negative real number.

Furthermore, in an embodiment of the present disclosure, X/Y coordinates (x, y) can be transformed into U/V/W coordinates (u, v, w) by the following formula:

$$a = \sqrt{x^2+y^2}, b = \tan^{-1}\left(\frac{y}{x+eps}\right), u = \text{sign}(x)\cdot a\cdot\cos\left(b+\frac{11\pi}{6}\right), v = -y,$$

$$w = \text{sign}(x)\cdot a\cdot\cos\left(b+\frac{7\pi}{6}\right)$$

Wherein eps represents an extremely small positive real number; sign(x) is the polarity of x, and the value of sign(x) is +1 or 1; if x is 0, the value of sign(x) is +1; and the value of x is a non-negative real number.

The data processing module 4 can respectively acquire the positions of the plurality of electrodes of the electrode layer 2 in the three-axis coordinate system, for example, can determine the position information of the electrode center in the three-axis coordinate system. Further, the data processing module 4 can determine the weights of each electrode in the touch selection area respectively relating to three coordinate axes of the coordinate system, wherein each one of the weights of the corresponding electrode is determined on the basis of a projection distance from a central point of the corresponding electrode to a corresponding one of the coordinate axes; and the data processing module 4 can calculate, for each one of the coordinate axes, the products each obtained by multiplying the capacitance variation of a corresponding electrode by the weight of that corresponding electrode relating to the corresponding coordinate axes, and the ratio of a sum of the products corresponding to the electrodes to a sum of the capacitances formed by the electrodes in the touch selection area, and can further determine position coordinates of a touch point on the basis of the ratio corresponding to each coordinate axis.

For example, in an embodiment of the present disclosure, the data processing module 4 can determine the position information of the electrodes in the touch selection area after the touch selection area is determined. Therefore, the weights of each electrode relating to each coordinate axis can be determined. For example, a first weight of each electrode relating to the u-axis can be a first projection distance of the center of the electrode on the u-axis; a second weight of each electrode relating to the v-axis can be a second projection distance of the center of the electrode on the v-axis; and a third weight of each electrode relating to the w-axis can be a third projection distance of the center of the electrode on the w-axis. After the three weights of each electrode in the touch selection area relating to each coordinate axis are acquired, a sum of the products each obtained by multiplying the capacitance variation of a corresponding electrode by the weight of that corresponding electrode relating to the corresponding coordinate axes is calculated. For example, the products each obtained by multiplying the capacitance variation of a corresponding electrode by the first weight of that corresponding electrode relating to the u-axis are summarized to obtain a first sum; the products each obtained by multiplying the capacitance variation of a corresponding electrode by the second weight of that corresponding electrode relating to the v-axis are summarized to obtain a second sum; the products each obtained by multiplying the capacitance variation of a corresponding electrode by the third weight of that corresponding electrode relating to the w-axis are summarized to obtain a third sum; and finally, a u-axis coordinate value of the touch position is determined on the basis of a first ratio of the first sum to the sum of the capacitances of the electrodes in the touch selection area; a v-axis coordinate value of the touch position is determined on the basis of a second ratio of the second sum to the sum of the capacitances of the electrodes in the touch selection area; a w-axis coordinate value of the touch position is determined on the basis of a third ratio of the third sum to the sum of the capacitances of the electrodes in the touch selection area; therefore, the touch position is determined on the basis of the u-axis coordinate value, the v-axis coordinate value and the w-axis coordinate value. That is, the point formed by the three coordinate values can be determined as the touch position.

The touch position of the touch operation can be determined through the above-described configurations. The embodiments of the present disclosure determine the touch position via a three-axis coordinate system in a plane, thus are suitable for the touch panels in various shapes. Compared to conventional touch position determination mode via a rectangular coordinate system, the embodiments of the present disclosure do not need to execute transverse and longitudinal incomplete operations, thus saving circuit designs, and reducing corresponding cost.

Further, in practical use, due to the influence of noises, the sum of the coordinate values u, w and w of the touch position often does not satisfy the condition of u+v+w=0. Therefore, in embodiments of the present disclosure, in order to further improve the touch position determination precision, three-axis coordinate values can be transformed into rectangular coordinate values to perform optimization, wherein the three coordinate values (u, v and w) of the determined touch position can be pairwise combined, and transformed into values x and y in the rectangular coordinate system to obtain three sets of values x and y; then the coordinate value of the touch position under the rectangular coordinate system can be acquired on the basis of the average of the three sets of values x and y, thus further improving position precision. For example, a first set of values x and y can be determined on the basis of the values u and v in the three-axis coordinate values; a second set of values x and y can be determined on the basis of the values u and w in the three-axis coordinate values; a third set of values x and y can be determined on the basis of the values v and w in the three-axis coordinate values; the three sets of values x are averaged to obtain $\bar{x}$, and the three sets of values y are averaged to obtain $\bar{y}$; and finally $\bar{x}$ and $\bar{y}$ are utilized to obtain the coordinate values of the touch position under the rectangular coordinate system.

The description above is only an example how to determine a touch position on the basis of the weights and capacitance variations of the electrodes in the touch selection area. And the embodiments of the present disclosure do not limit the specific methods how to determine weights and how to determine a touch position on the basis of the weights.

In summary, in the embodiments of the present disclosure, the electrode layer of the touch panel may be formed by hexagonal electrodes; compared to a square electrode, the hexagonal electrode is more suitable for circular or elliptic touch panels, and is also suitable for square touch panels, thus having a better adaptability; in addition, the number of the electrodes can be reduced by adopting hexagonal electrodes, thus reducing cost, and reducing corresponding circuit design and power consumption; in addition, the adoption of hexagonal electrodes can improve the touch detection sensitivity.

In addition, an embodiment of the present disclosure further provides an electronic device; the electronic device may comprise the touch panel as described in the embodiments above, wherein the electronic device in the embodiment of the present disclosure may comprise a device having a touch function such as a mobile phone, a computer, a notebook computer and the like. That is, the electronic device in the embodiment of the present disclosure may comprise any device having a touch function, which will not be illustrated one by one herein.

In addition, the touch panel in the embodiment of the present disclosure can be disposed at any position of the electronic device, which can be set differently by a person skilled in the art according to requirements, and will not be defined herein.

In addition, the specific configurations of the touch panel in the electronic device in the embodiment of the present disclosure are the same as that described in the embodiments above, and will not be repeated here. The electronic device may also have other data processing functions, which can be set by a person skilled in the art according to different requirements, and will not be defined herein.

Figure 6:
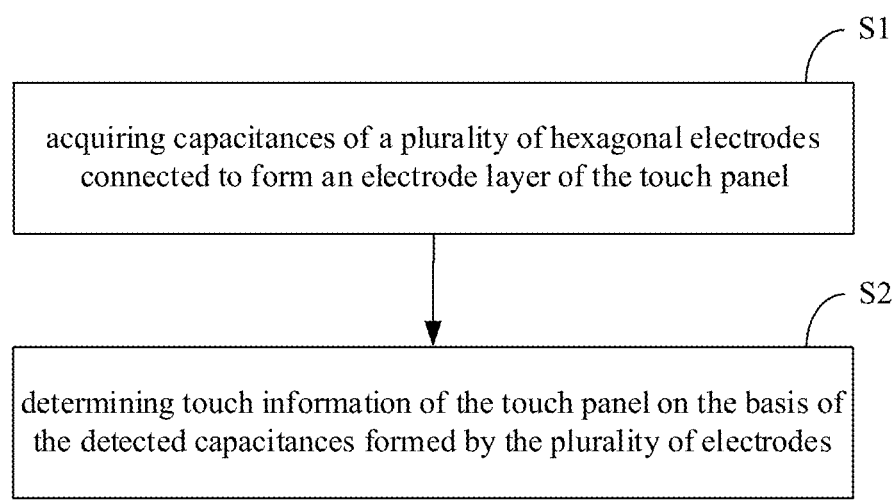
FIG. 6 shows a flow chart of the information processing method according to one embodiment of the present disclosure.

Further, an embodiment of the present disclosure further provides an information processing method; the method can be applied to the touch panel or the electronic device in the above-described embodiments to determine touch information of the touch panel. FIG. 6 shows a flow chart of the information processing method according to one embodiment of the present disclosure. Wherein the method may comprise:

S1, acquiring capacitances of a plurality of hexagonal electrodes connected to form an electrode layer of the touch panel, wherein the electrode layer and the touch panel have corresponding shapes; and S2, determining touch information of the touch panel on the basis of the detected capacitances formed by the plurality of electrodes.

The touch panel in the embodiment of the present disclosure may comprise a detection module 3 and a data processing module 4 (as shown in FIG. 4). Wherein the detection module 3 can be connected to the plurality of electrodes of the electrode layer 2, and is configured to detect the capacitances formed by the electrodes. The data processing module 4 can be connected to the detection module 3, and can be configured to determine the touch information of the touch panel on the basis of the capacitances formed by the electrodes detected by the detection module 3. Namely, the detection module 3 can be used to detect the capacitance formed by the electrodes of the electrode layer 2; if a touch operation occurs, the touch operation would cause capacitance variations to the electrodes; the detection module 3 detects in real time the capacitances formed by the electrodes, and determines the capacitance variation of each electrode, and transmits the capacitance variation to the data processing module 4, such that the data processing module 4 can further determine whether the touch operation occurs, and determine the information such as the position of the touch operation and the like.

Figure 7:
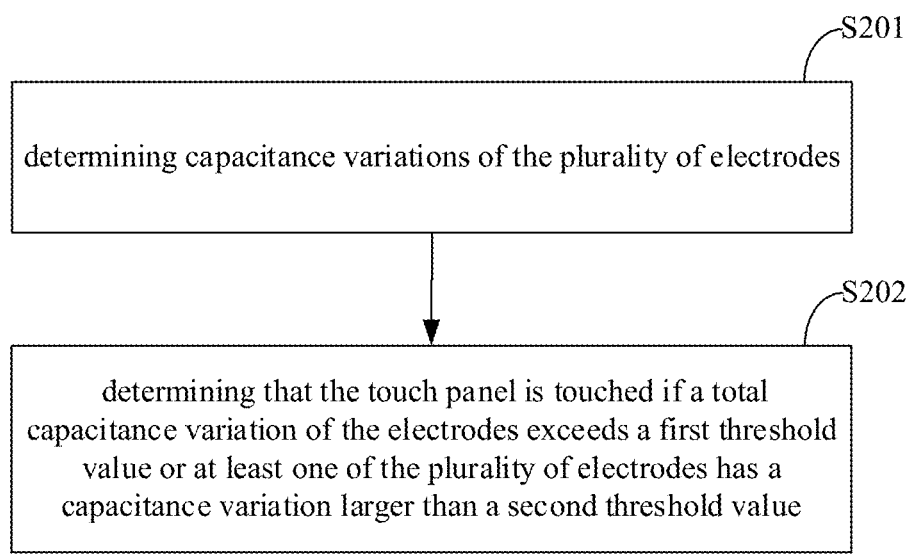
FIG. 7 shows a flow chart of a touch information determination method according to one embodiment of the present disclosure.

Firstly, the data processing module 4 can determine whether a touch operation occurs on the basis of the capacitance variation. FIG. 7 shows a flow chart of a touch information determination method according to one embodiment of the present disclosure. As shown in FIG. 7, step S2 may further comprise:

S201, determining capacitance variations of the plurality of electrodes; and

S202, determining that the touch panel is touched if a total capacitance variation of the electrodes exceeds a first threshold value or at least one of the plurality of electrodes has a capacitance variation larger than a second threshold value.

In an embodiment of the present disclosure, the data processing module 4 can determine whether a touch operation occurs on the basis of the capacitance variations of the plurality of electrodes of the electrode layer 2, or can determine whether a touch operation occurs on the basis of the capacitance variation of the capacitance-changed electrode of the electrode layer 2. The data processing module 4 can acquire the capacitances and the capacitance variations of all the electrodes of the electrode layer 2 by the detection module 3, and can determine a touch operation is executed on the touch panel if a total capacitance variation of the capacitance-changed electrodes exceeds a first threshold value. Alternatively, the data processing module 4 can also determine that the touch panel is touched if at least one of plurality of electrodes has a capacitance variation larger than a second threshold value. If the data processing module 4 determines that the total capacitance variation of the capacitance-changed electrodes does not exceed the first threshold value, and none of the capacitance variation of the plurality of electrode exceeds the second electrode, it can be determined that no touch operation is executed on the touch panel, and no response will be made. Wherein the first threshold value and the second threshold value can be the same, and can also be different, which can be set by a person skilled in the art according to different requirements.

If the touch panel is determined to be touched, the data processing module 4 can further determine a touch position of the touch operation. In an embodiment of the present disclosure, step of determining touch information of the touch panel on the basis of the detected capacitances formed by the plurality of electrodes comprises: determining the capacitance variations of the plurality of electrodes; and determining a touch selection area on the basis of one or more electrodes each having a capacitance variation larger than a second threshold among the plurality of electrodes, and determining a touch position on the basis of the capacitance variations and weights of the electrodes in the touch selection area.

In an embodiment of the present disclosure, the data processing module 4 can determine a touch selection area on the basis of one or more electrodes each having a capacitance variation larger than the second threshold among the plurality of electrodes, and determine a touch position on the basis of the capacitance variations and weights of the electrodes in the touch selection area.

As described above, in an embodiment of the present disclosure, the data processing module 4 can first determine a touch selection area according to the electrodes of which the capacitance variations exceed the second threshold value, wherein the touch selection area is an approximate position area of the touch operation. In an embodiment of the present disclosure, the data processing module 4 can acquire identification information and corresponding position information of the plurality of electrodes of the electrode layer 2. For example, the data processing module 4 can store the identification information and the position information, or can acquire the identification information and the position information from a memory. if the detection module 3 transmits the capacitances or the capacitance variations of the electrodes to the data processing module 4, the detection module 3 can transmit the identification information of the electrodes, such that the data processing module 4 can easily determine the positions of the capacitance-changed electrodes. Wherein the identification information is unique information for determining the electrode, and can be a unique code or an icon, which will be not defined herein.

In addition, in an embodiment of the present disclosure, step of determining a touch selection area on the basis of one or more electrodes each having a capacitance variation larger than a second threshold among the plurality of electrodes may further comprise: determining an electrode, having a largest capacitance variation among the one or more electrodes each having the capacitance variation larger than the second threshold value, as a third electrode; and determining a preset range as the touch selection area, wherein the preset range extends outward by taking the third electrode as a center.

The data processing module 4 can also determine a touch selection area according to a preset rule on the basis of the position of the electrode with the greatest capacitance variation. The data processing module 4 can determine an electrode, having a largest capacitance variation among the one or more electrodes each having the capacitance variation larger than the second threshold value, as a third electrode, and determine a preset range as the touch selection area, wherein the preset range extends outward by taking the third electrode as a center. For example, the data processing module 4 can take the third electrode as a center and arrange the plurality of electrodes in extending directions by a preset number of rings, and determine the area formed by the electrodes in the rings as the touch selection area. That is, if a touch operation is executed, the position of the electrode with the greatest capacitance can be basically determined as a position in proximity to a touch center; the data processing module 4 extends outward by the preset number of rings by taking the electrode with the greatest capacitance corresponding to the position as a center; and the electrodes in the rings form the touch selection area.

The embodiment of the present disclosure can determine the preset range in multiple ways. For example, the information pertaining to the preset number of rings can be determined according to a preset parameter; that is, the ring number information can be preset by a user, and can also be pre-stored in the data processing module 4; if a touch selection area is determined, the preset information can be directly used by the data processing module 4 to execute the operation.

In other embodiments of the present disclosure, the data processing module 4 can also determine the above-described preset number of rings according to a touch range in which the user executes touch operations in a preset time; that is, the data processing module 4 can record a range of touch areas in which the user executes touch operations in a preset time, and determine the above-described preset number of rings on the basis of the size of the preset range and the size of the electrodes. For example, the range of the touch area can be embodied in an area manner; first an average range of touch operations is determined via an average area of touch ranges in which the touch operations are performed in a preset time, and the information pertaining to the number of rings can be determined on the basis of the average range and the size of the electrodes. The touch operations in the embodiment of the present disclosure can be a single point touch operation, and can also be a continuous touch operation, wherein the continuous touch operation can be considered to be multiple single point touch operations.

After the preset number of rings is determined, the data processing module 4 can extend outward by the preset range corresponding to the preset number of rings by taking the third electrode as a center, so as to determine the touch selection area. After the touch selection area is determined, the data processing module 4 can further determine a position of the touch point; for example, the position of the touch point can be determined on the basis of the capacitance variations and weights of the electrodes in the touch selection area.

In an embodiment of the present disclosure, the step of determining a touch position on the basis of the capacitance variations and weights of the electrodes in the touch selection area may comprise: establishing a three-axis coordinate system; determining the weights of each electrode in the touch selection area respectively relating to three coordinate axes of the coordinate system, wherein each one of the weights of the corresponding electrode is determined on the basis of a projection distance from a central point of the corresponding electrode to a corresponding one of the coordinate axes; and calculating, for each one of the coordinate axes, the products each obtained by multiplying the capacitance variation of a corresponding electrode by the weight of that corresponding electrode relating to the corresponding coordinate axes, and the ratio of a sum of the products corresponding to the electrodes to a sum of the capacitances formed by the electrodes in the touch selection area; and determining position coordinates of a touch point on the basis of the ratio corresponding to each coordinate axis.

As described above, the data processing module 4 in the embodiment of the present disclosure can acquire the position information of the plurality of electrodes; and the position information can be denoted in a coordinate manner. In an embodiment of the present disclosure, a three-axis coordinate system can be established to denote the position information of the electrodes.

FIG. 5 shows a structural schematic view of the three-axis coordinate system of the touch panel according to one embodiment of the present disclosure, wherein the three coordinate axes u-axis, v-axis and w-axis of the three-axis coordinate system are arranged in the same plane; the angle between every two axes is 120 degrees; and the center of the first electrode can be the origin point of the three-axis coordinate system. To facilitate expression, square orthogonal coordinate axes can be respectively defined as x-axis and y-axis; correspondingly, regular hexagon orthogonal coordinate axes can also be x-axis and y-axis, and u-axis, v-axis and w-axis are distributed every $2\pi/3$ angle, wherein the w-axis and the y-axis are opposite in direction. The coordinates on the x-axis and the y-axis of the rectangular coordinate system and the coordinates on the u-axis, the v-axis and the w-axis of the three-axis coordinate system can be mutually transformed; furthermore, the u-axis, the v-axis and the w-axis of the three-axis coordinate system are averagely distributed in a two-dimensional plane, and therefore, the an effective coordinate value of a regular hexagon satisfies $u+v+w=0$, that is, the sum of the coordinate values on the three coordinate axes is zero.

The data processing module 4 can respectively acquire the positions of the plurality of electrodes of the electrode layer 2 in the three-axis coordinate system, for example, can determine the position information of the electrode center in the three-axis coordinate system. Further, the data processing module 4 can determine the weights of each electrode in the touch selection area respectively relating to three coordinate axes of the coordinate system, wherein each one of the weights of the corresponding electrode is determined on the basis of a projection distance from a central point of the corresponding electrode to a corresponding one of the coordinate axes, and the data processing module 4 can calculate, for each one of the coordinate axes, the products each obtained by multiplying the capacitance variation of a corresponding electrode by the weight of that corresponding electrode relating to the corresponding coordinate axes, and the ratio of a sum of the products corresponding to the electrodes to a sum of the capacitances formed by the electrodes in the touch selection area, and can further determine position coordinates of a touch point on the basis of the ratio corresponding to each coordinate axis.

For example, in an embodiment of the present disclosure, the data processing module 4 can determine the position information of the electrodes in the touch selection area after the touch selection area is determined. Therefore, the weights of each electrode relating to each coordinate axis can be determined. For example, a first weight of each electrode relating to the u-axis can be a first projection distance of the center of the electrode on the u-axis; a second weight of each electrode relating to the v-axis can be a second projection distance of the center of the electrode on the v-axis; and a third weight of each electrode relating to the w-axis can be a third projection distance of the center of the electrode on the w-axis. After the three weights of each electrode in the touch selection area relating to each coordinate axis are acquired, a sum of the products each obtained by multiplying the capacitance variation of a corresponding electrode by the weight of that corresponding electrode relating to the corresponding coordinate axes is calculated. For example, the products each obtained by multiplying the capacitance variation of a corresponding electrode by the first weight of that corresponding electrode relating to the u-axis are summarized to obtain a first sum; the products each obtained by multiplying the capacitance variation of a corresponding electrode by the second weight of that corresponding electrode relating to the v-axis are summarized to obtain a second sum; the products each obtained by multiplying the capacitance variation of a corresponding electrode by the third weight of that corresponding electrode relating to the w-axis are summarized to obtain a third sum; and finally, a u-axis coordinate value of the touch position is determined on the basis of a first ratio of the first sum to the sum of the capacitances of the electrodes in the touch selection area; a v-axis coordinate value of the touch position is determined on the basis of a second ratio of the second sum to the sum of the capacitances of the electrodes in the touch selection area; a w-axis coordinate value of the touch position is determined on the basis of a third ratio of the third sum to the sum of the capacitances of the electrodes in the touch selection area; therefore, the touch position is determined on the basis of the u-axis coordinate value, the v-axis coordinate value and the w-axis coordinate value. That is, the point formed by the three coordinate values can be determined as the touch position.

The touch position of the touch operation can be determined through the above-described configurations. The embodiments of the present disclosure determine the touch position via a three-axis coordinate system in a plane, thus are suitable for the touch panels in various shapes. Compared to conventional touch position determination mode via a rectangular coordinate system, the embodiments of the present disclosure do not need to execute transverse and longitudinal incomplete operations, thus saving circuit designs, and reducing corresponding cost.

Further, in practical use, due to the influence of noises, the sum of the coordinate values u, w and w of the touch position often does not satisfy the condition of $u+v+w=0$. Therefore, in embodiments of the present disclosure, in order to further improve the touch position determination precision, three-axis coordinate values can be transformed into rectangular coordinate values to perform optimization, wherein the determined three coordinate values (u, v and w) of the determined touch position can be pairwise combined, and transformed into values x and y in the rectangular coordinate system to obtain three sets of values x and y; and then the coordinate value of the touch position under the rectangular coordinate system can be acquired on the basis of the average of the three sets of values x and y, thus further improving position precision. For example, a first set of values x and y can be determined on the basis of the values u and v respectively in the three-axis coordinate values; a second set of values x and y can be determined on the basis of the values u and w respectively in the three-axis coordinate values; a third set of values x and y can be determined on the basis of the values v and w respectively in the three-axis coordinate values; the three sets of values x are averaged to obtain $\bar{x}$, and the three sets of values y are averaged to obtain $\bar{y}$; and finally $\bar{x}$ and $\bar{y}$ are utilized to obtain the coordinate values of the touch position under the rectangular coordinate system.

In summary, in the embodiments of the present disclosure, the electrode layer of the touch panel may be formed by hexagonal electrodes; compared to a square electrode, the hexagonal electrode is more suitable for circular or elliptic touch panels, and is also suitable for square touch panels, thus having a better adaptability; in addition, the number of the electrodes can be reduced by adopting hexagonal electrodes, thus reducing cost, and reducing corresponding circuit design and power consumption; in addition, the adoption of hexagonal electrodes can improve the touch detection sensitivity.

The present disclosure can be a system, a method and/or a computer program product. The computer program product may comprise a computer readable storage medium having stored therein computer readable program instructions for the processor to realize various aspects of the present disclosure.

The computer readable storage medium can be a physical device capable of retaining and storing an instruction for use by an instruction execution device. The computer readable storage medium, for example, can be but not limited to an electrical storage device, a magnetic storage device, an optical storage device, an electromagnetic storage device, a semiconductor storage device or any appropriate combinations thereof. More specific examples (non-exhaustively listed) of the computer readable storage medium comprise: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital video disk (DVD), a memory stick, a floppy disk, a mechanical encoding device, an in-groove protrusion structure or a punch card having stored therein an instruction, and any appropriate combinations thereof. The computer readable storage medium used herein is not explained as an instantaneous signal, such as a radio wave or other freely transmitted electromagnetic waves, an electromagnetic wave transmitted via a waveguide or other transmission medium (for example, a light pulse passing an optical fiber cable), or an electrical signal transmitted via an electric wire.

The computer readable program instruction described herein can be downloaded from the computer readable storage medium to a computing/processing device, or downloaded to an external computer or an external storage device via a network, such as an Internet, a local area network, a wide area network and/or a wireless network. The network may comprise a copper transmission cable, an optical fiber transmitter, a wireless transmitter, a router, a firewall, a switch, a gateway computer and/or an edge server. A network adapter card or a network interface in each computing/processing device receives the computer readable program instruction from the network, and forwards the computer readable program instruction, so as to store the computer readable program instruction in the computer readable storage medium of the computing/processing device.

The computer program instruction for executing the operations of the present disclosure can be an assembly instruction, an instruction set architecture (ISA) instruction, a machine instruction, a machine related instruction, a micro-code, a firmware instruction, state setting data, or a source code or a target code compiled with any combinations of one or more programming languages; the programming languages comprise object oriented programming languages such as Smalltalk, C++ and the like, and conventional procedural programming languages such as the "C" language, or similar programming languages. The computer readable program instruction can be completely executed on a user computer, partially executed on the user computer, executed as an independent software packet, executed partially on the user computer and partially on a remote computer, or completely executed on the remote computer or a server. In the case of involving a remote computer, the remote computer can be connected to the user computer via any types of networks, such as a local area network (LAN) or a wide area network (WAN), or can be connected to an external computer (for example, via an Internet provided by an Internet service supplier). In some embodiments, a personal electronic circuit, such as a programmable logic circuit, a field-programmable gate array (FPGA) or a pro logic array (PLA), is customized by utilizing the state information of the computer readable program instruction; the electronic circuit can execute the computer readable program instruction to realize various aspects of the present disclosure.

Various aspects of the present disclosure are described herein with reference to the flow charts and/or block diagrams of the method, device (system) and computer program product according to the embodiments of the present disclosure. It should be understood that each block in the flow charts and/or the block diagrams can be combined with another block in the flow charts and/or the block diagrams via computer readable program instructions.

The computer readable instructions can be supplied to the processors of a general-purpose computer, a specialized computer, or other programmable data processing devices, so as to produce a machine, such that if the instruction is executed by the processors of the computers or other programmable data processing devices, a device for realizing a specified function/action in one or more blocks in the flow charts and/or the block diagrams can be generated. The computer readable program instructions can also be stored in a computer readable storage medium; the instructions enable a computer, a programmable data processing device and/or other devices to operate in a specific mode; therefore, the computer readable medium having stored therein the instructions is a product comprising various instructions for realizing a specified function/action in one or more blocks in the flow charts and/or the block diagrams.

The computer readable program instructions can also be loaded to a computer, other programmable data processing devices, or other devices, such that a series of operation steps can be executed on the computer, other programmable devices or other devices to generate a computer realizable process; therefore, the computer, other programmable devices or other devices can execute the instructions to realize a specified function/action in one or more blocks in the flow charts and/or the block diagrams.

The flow charts and the block diagrams in the drawings show a system architecture, functions and operations that the system, method and computer program product according to multiple embodiments of the present disclosure may realize. In this respect, each block in the flow charts or the block diagrams may represent a module, a program segment or a part of an instruction; the module, the program segment or a part of an instruction comprise one or more executable instructions for realizing a specified logic function. In an alternative implementation, the functions marked in the blocks can also occur in an order different from the sequence in the drawings. For example, two sequent blocks actually can be executed basically in parallel, and sometimes can also be executed in a reverse order, which depends on the involved functions. It should be further noted that each block in the block diagrams and/or the flow charts, and a combination of the blocks in the block diagrams and/or the flow charts can be realized via a hardware based system specially for executing a specified function or action, or via a combination of special hardware and a computer instruction.

The embodiments of the present disclosure are already described above. The descriptions above are illustrative but not exhaustive, and are not limited to the disclosed embodiments. Numerous modifications and changes will be apparent to those skilled in the art without departing from the scope and spirit of the illustrated embodiments. The terms used herein are intended to explain the principle and practical use of each embodiment or a technical improvement in the prior art, or intended to enable a person skilled in the art to understand the embodiments disclosed herein.

What is claimed is:

1. A touch panel, comprising:
    a substrate;
    an electrode layer formed in or on the substrate, wherein the electrode layer and the touch panel have corresponding shapes, and the electrode layer comprises a plurality of hexagonal electrodes which are connected to form the electrode layer;
    at least one capacitive sensor, connected to the plurality of hexagonal electrodes of the electrode layer, for detecting capacitance values formed by the plurality of hexagonal electrodes; and
    a processor, connected to the at least one capacitive sensor, for determining a touch selection area based on the capacitance values which are formed by the plurality of hexagonal electrodes and detected by the at least one capacitive sensor, and determining a touch position based on capacitance variations and weights of the plurality of hexagonal electrodes in the touch selection area;
    wherein the processor is configured to:
        obtain a subset consisting of one or more of the plurality of hexagonal electrodes, wherein each electrode in the subset has a capacitance variation larger than a second threshold value;
        identify one electrode with a largest capacitance variation in the subset, as a determined electrode; and
        determine a preset range as the touch selection area, wherein the preset range extends outwards by taking the determined electrode as a center of the touch selection area,
    wherein the processor is further configured to:
    establish a three-axis coordinate system, and
    determine each weight of each of the plurality of hexagonal electrodes in the touch selection area respectively relating to three coordinate axes of the coordinate system, wherein each one of the weights of the corresponding one of the plurality of hexagonal electrodes is determined based on a projection distance from a central point of the corresponding one of the plurality of hexagonal electrodes to a corresponding one of the coordinate axes;
    calculate, for each one of the coordinate axes, the products each obtained by multiplying the capacitance variation of a corresponding one of the plurality of hexagonal electrodes by the weight of the corresponding one of the plurality of hexagonal electrodes relating to the corresponding coordinate axes, and a ratio of a sum of the products corresponding to the plurality of hexagonal electrodes to a sum of the capacitance values formed by the plurality of hexagonal electrodes in the touch selection area; and
    determine position coordinates of a touch point based on the ratio corresponding to each coordinate axes.

2. The touch panel according to claim 1, wherein the plurality of hexagonal electrodes comprises a first hexagonal electrode as a center electrode and second hexagonal electrodes surrounding the first hexagonal electrode, the second hexagonal electrodes are sequentially connected and arranged in extending directions by taking the first hexagonal electrode as a center of the electrode layer.

3. The touch panel according to claim 1, wherein the processor is further configured to determine that the touch panel is touched if
    a total variation of the capacitance values of the plurality of hexagonal electrodes exceeds a first threshold value, or
    at least one of the plurality of hexagonal electrodes has a capacitance variation greater than the second threshold value.

4. The touch panel according to claim 1, wherein
    the substrate is constructed in a circular shape or in an elliptic shape.

5. An electronic device, comprising the touch panel as claimed in claim 1.

6. An information processing method, wherein the method is used for determining touch information of a touch panel, and comprises:
    acquiring capacitance values of a plurality of hexagonal electrodes connected to form an electrode layer of the touch panel, wherein the electrode layer and the touch panel have corresponding shapes; and
    determining touch information of the touch panel based on the detected capacitance values formed by the plurality of hexagonal electrodes;
    wherein step of determining touch information of the touch panel based on the detected capacitance values formed by the plurality of hexagonal electrodes comprises:
    determining capacitance variations of the plurality of hexagonal electrodes;
    obtaining a subset consisting of one or more of the plurality of hexagonal electrodes, wherein each electrode in the subset has a capacitance variation greater than a second threshold value;
    identifying one electrode with a largest capacitance variation in the subset, as a determined electrode;
    determining a preset range as a touch selection area, wherein the preset range extends outward by taking the determined electrode as a center of the touch selection area; and
    determining a touch position based on the capacitance variations and weights of the plurality of hexagonal electrodes in the touch selection area, wherein determining the touch position based on the capacitance variations and the weights of the plurality of hexagonal electrodes in the touch selection area comprises:

establishing a three-axis coordinate system;

determining each weight of each of the plurality of hexagonal electrodes in the touch selection area respectively relating to three coordinate axes of the coordinate system, wherein each weight of a corresponding one of the plurality of hexagonal electrodes is determined based on a projection distance from a central point of the corresponding one of the plurality of hexagonal electrodes to a corresponding one of the coordinate axes;

calculating, for each one of the coordinate axes, the products each obtained by multiplying the capacitance variation of the corresponding one of the plurality of hexagonal electrodes by the weight of the corresponding one of the plurality of hexagonal electrodes relating to the corresponding coordinate axes, and a ratio of a sum of the products corresponding to the plurality of hexagonal electrodes to a sum of the capacitance values formed by the plurality of hexagonal electrodes in the touch selection area; and determining position coordinates of a touch point based on the ratio corresponding to each one of the coordinate axes.

7. The method according to claim 6, wherein step of determining touch information of the touch panel based on the detected capacitance values formed by the plurality of hexagonal electrodes further comprises:

determining that the touch panel is touched if
a total capacitance variation of the plurality of hexagonal electrodes exceeds a first threshold value, or
at least one of the plurality of hexagonal electrodes has a capacitance variation larger than the second threshold value.

* * * * *